(12) United States Patent
Tanaka (10) Patent No.: US 8,400,549 B2
(45) Date of Patent: Mar. 19, 2013

(54) IMAGING AND DISPLAY APPARATUS AND METHOD

(75) Inventor: Satoshi Tanaka, Tokorozawa (JP)

(73) Assignee: Olympus Imaging Corp. (JP)

( * ) Notice: Subject to any disclaimer, the term of this patent is extended or adjusted under 35 U.S.C. 154(b) by 722 days.

(21) Appl. No.: 12/329,748

(22) Filed: Dec. 8, 2008

(65) Prior Publication Data

US 2009/0167920 A1 Jul. 2, 2009

(30) Foreign Application Priority Data

Dec. 28, 2007 (JP) .................................. 2007-340338

(51) Int. Cl.
*H04N 5/222* (2006.01)
*H04N 5/235* (2006.01)
*G06K 9/32* (2006.01)
*G06K 9/00* (2006.01)

(52) U.S. Cl. ................ 348/333.02; 348/230.1; 382/299; 382/148

(58) Field of Classification Search .................. 382/154; 345/427; 348/222.1, 42–60

See application file for complete search history.

(56) References Cited

U.S. PATENT DOCUMENTS

| 3,971,065 | A * | 7/1976 | Bayer ........................... 348/276 |
| 6,426,493 | B1 * | 7/2002 | Oda ........................... 250/208.1 |
| 2003/0210338 | A1 * | 11/2003 | Matsuoka et al. ....... 348/231.99 |
| 2004/0017487 | A1 * | 1/2004 | Ueda ........................... 348/222.1 |
| 2004/0239803 | A1 * | 12/2004 | Selby et al. .................... 348/459 |
| 2005/0168425 | A1 * | 8/2005 | Takada et al. .................... 345/94 |
| 2007/0061797 | A1 * | 3/2007 | Atsatt et al. .................... 717/166 |
| 2007/0070212 | A1 * | 3/2007 | Haneda ....................... 348/222.1 |

FOREIGN PATENT DOCUMENTS

JP 2007-097033 4/2007

* cited by examiner

*Primary Examiner* — Roberto Velez
*Assistant Examiner* — Stephen Coleman
(74) *Attorney, Agent, or Firm* — Ostrolenk Faber LLP (57) ABSTRACT

The object of the present invention is to provide an imaging and display apparatus and method for providing small and reasonable apparatus while the imaging frame rate of the imaging element can be high without decreasing the resolution of the display image. For this object, an imaging and display apparatus comprises an imaging element 12 for performing photo electric conversion on an optical image formed by an optical system 11, a display element 20 for displaying image information, a readout control section 14 for sequentially reading out the image information from the imaging element 12, and a image selection section 17 for selecting image information to be displayed on the display element 20 from the image information sequentially read out of the imaging element 12 by the readout control section 14. The readout control section 14 controls the readout of the imaging element 12 so that spatially different image information is included in the sequential readout period of the imaging element 12 corresponding to the sequential display frames of the display element 20, and the image selection section 17 selects spatially different image information which is read out of the imaging element 12 in sequential display frames.

7 Claims, 12 Drawing Sheets

IMAGING AND DISPLAY APPARATUS AND METHOD

CROSS-REFERENCE TO RELATED APPLICATION

The present application claims priority from Japanese Application No. 2007-340338, filed on Dec. 28, 2007, the content of which is incorporated herein by reference.

BACKGROUND OF THE INVENTION

1. Field of the Invention

The present invention relates to an imaging and display apparatus and method for displaying image information obtained by an imaging device on a display element.

2. Description of the Related Art

Digital cameras with an imaging device comprising image sensor such as CCD sensor or CMOS sensor have been commonly used as imaging and display apparatuses. A digital camera obtains optical images with an imaging device, and display the images on a display element such as LCD as through images, and store the images in a storage media such as a memory card as still images or moving images in response to pressing of a release button or the like.

In general, the number of pixels of a display element is less than that of an imaging element. Therefore, when displaying the through images on the display element, pixels of the imaging element is read out by means of pixel subsampling, or addition processing of pixel information is performed, in order to adapt to the number of pixels of the display element.

Many digital cameras generally have AF (Auto Focus) function and/or AE (Auto Exposure) function. A phase difference detection scheme and a contrast detection scheme are known as AF schemes. In particular, when employing the contrast detection scheme, it takes much time for AF processing if imaging frame rate of the imaging element is low.

Figure 12:
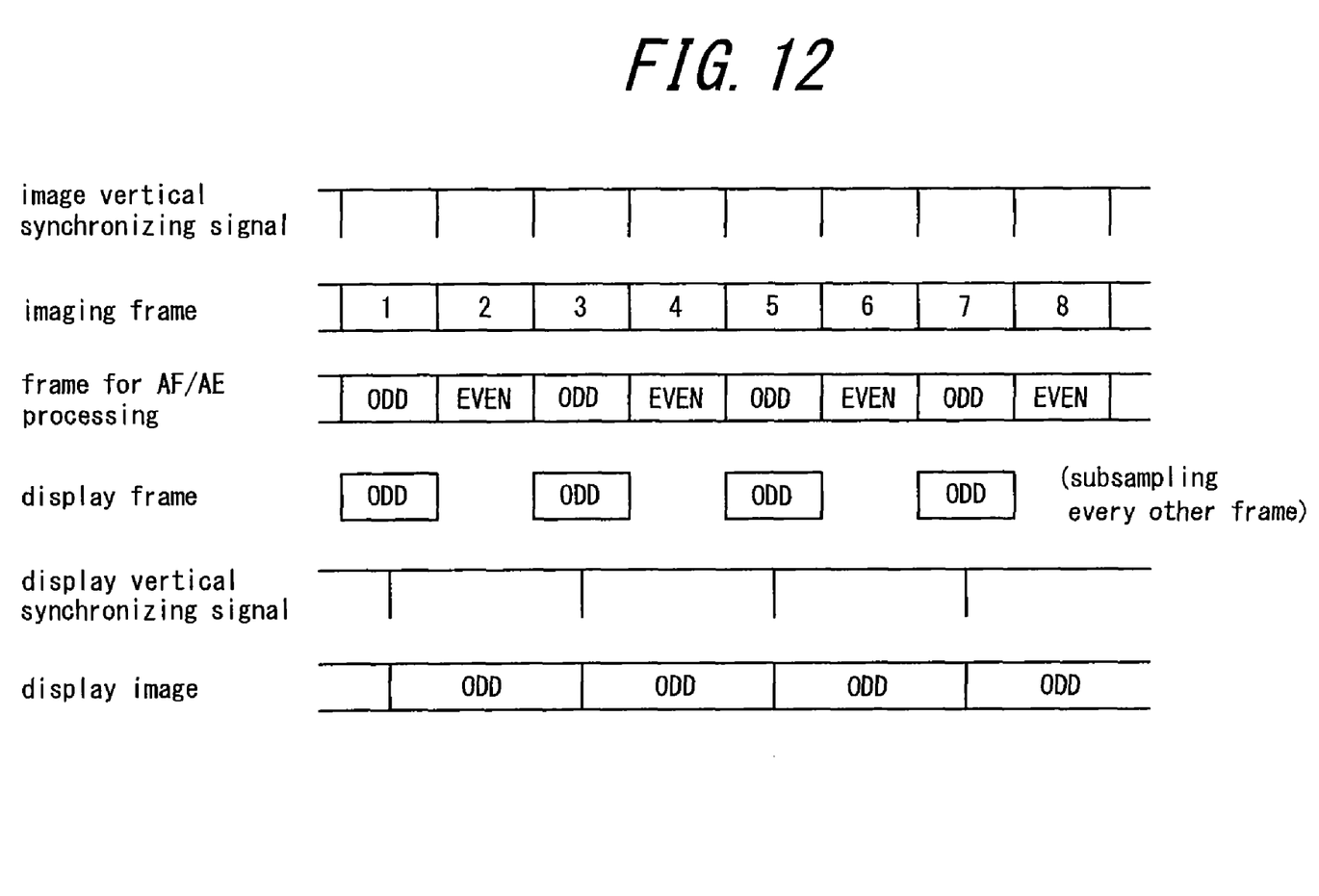
FIG. 12 is a timing chart explaining a prior art.

An example method for solving the problem is shown in FIG. 12. In the example, the imaging frame rate of an imaging element is 120 fps, which is twice as high as the display frame rate of 60 fps of a display element. Spatially different image information in the vertical direction, for example, image information of odd lines (ODD) and image information of the even lines (EVEN) are alternately read out of sequential imaging frames from the imaging element, and the sequential image information is used for AF processing and AE processing. On the other hand, the display element displays images by skipping every other frame in an interlaced manner.

Another method to solve the problem is to provide two imaging elements. In a known imaging apparatus, when performing the AF processing, one imaging element is used for the AF processing and the other is used for displaying through images on a display element (for example, refer to Japanese Patent Application Laid-Open No. 2007-097033, hereinafter called patent document 1).

In the example shown in FIG. 12, however, resolution in the vertical direction become low, because the display element can display only one image information of ODD and EVEN.

On the other hand, in the display apparatus disclosed in the patent document 1, one imaging element can be driven in an appropriate imaging frame rate for the AF processing and the other can be driven in an appropriate imaging frame rate for the display frame rate of the display element, because two imaging elements are provided, and when performing the AF processing, one imaging element is used for the AF processing and the other is used for displaying a through image on the display element. Therefore, AF processing can be performed in a short time, while reduction of the resolution of the image displayed on the display element can be prevented.

However, in this case, the imaging apparatus becomes large because two independent readout control sections of the imaging elements are needed for the respective imaging elements, and it is concerned to incur cost increase.

SUMMARY OF THE INVENTION

Therefore, an object of the present invention, which has been made in view of such circumstances, is to provide an imaging and display apparatus and method which is small and inexpensive and, at the same time, the imaging frame rate of the imaging element of the apparatus can be high without deteriorating the resolution of the display image.

The first aspect of the invention, which achieves the object described above, is an imaging and display apparatus which generates a second image information in which plural kinds of frames including frames corresponding to spatially different pixel arrays form one cycle based on a first image information in which plural kinds of frames including frames corresponding to spatially different pixel arrays form one cycle, and which displays an image represented by said second image information, wherein said apparatus comprising; an imaging element for performing photoelectric conversion on an optical image formed by an optical system; a readout control section for controlling said imaging element for sequentially reading out the first image information in which plural kinds of frames including frames corresponding to spatially different pixel arrays included in the imaging element form one cycle; a display image information generating section for generating the second image information to be displayed based on said first image information, the second image information comprising plural kinds of frames including frames corresponding to spatially different pixel arrays included in the imaging element which form one cycle, and frame rate of which being lower than that of said first image information; and a display section for displaying an image represented by said second image information.

The second aspect of the invention resides in the imaging and display apparatus as set forth in the first aspect, wherein said readout control section controls the readout of said imaging element so that spatially different image information at least in the vertical direction is included.

The third aspect of the invention resides in the imaging and display apparatus as set forth in the first aspect, wherein said display image information generating section generates the second image information to be displayed based on the image information obtained by performing adding or averaging operation on the image information of sequential frames of said first image information corresponding to spatially identical pixel arrays included in the imaging element, wherein plural kinds of frames including frames corresponding to spatially different pixel arrays form one cycle in the second image information, and wherein frame rate of the second image information is lower than that of said first image information.

The forth aspect of the invention resides in the imaging and display apparatus as set forth in the first aspect, wherein said imaging element comprises a color filter in the form of Bayer array, and said display image information generating section generates said second image information so that the image information of each frame constituting said second image information includes color information in the Bayer array.

The fifth aspect of the invention resides in the imaging and display apparatus as set forth in the forth aspect, wherein said image information generating section generates said second image information based on the image information subsampled so as to include R, G, B image information constituting the Bayer array generated based on pixel signals of (1+8n)th vertical lines and (4+8n)th vertical lines and R, G, B image information constituting the Bayer array generated based on pixel signals of (3+8n)th vertical lines and (6+8n)th vertical lines, where n is a positive integer.

The sixth aspect of the invention resides in the imaging and display apparatus as set forth in the first aspect, wherein the apparatus further comprises a focus control section controlling said optical system to be focused by processing said first image information which is sequentially read out of said imaging element.

The seventh aspect of the invention resides in the imaging and display apparatus as set forth in the first aspect, wherein said display section comprises a display element for displaying the image represented by respective frames of said second image information including frames corresponding to spatially different pixel arrays included in the imaging element in a progressive manner, and an image shifting section for mutually shifting the images of the plural kinds of frames displayed by said display element.

The eighth aspect of the invention, which achieves the object described above, is an imaging and display method for an imaging and display apparatus which generates a second image information in which plural kinds of frames including frames corresponding to spatially different pixel arrays form one cycle based on a first image information in which plural kinds of frames including frames corresponding to spatially different pixel arrays form one cycle, and which displays an image represented by said second image information, wherein the method comprises; a step for sequentially reading out said first image information from an imaging element, in which plural kinds of frames including frames corresponding to spatially different pixel arrays included in the imaging element form one cycle; a step for generating said second image information to be displayed in which plural kinds of frames including frames corresponding to spatially different pixel arrays form one cycle, and frame rate of which is lower than that of said first image information; and a step for displaying the image represented by said second image information.

According to the present invention, the apparatus can be small and reasonable while the imaging frame rate of the imaging element becomes higher without losing the resolution of the display image, because, by using one imaging element, spatially different image information is selected and displayed in the sequential display frames by appropriately controlling the readout of the image information from said imaging element.

DESCRIPTION OF THE PREFERRED EMBODIMENTS

Embodiments of the present invention will be explained hereinafter, with reference to Figures.

Embodiment 1

Figure 1:
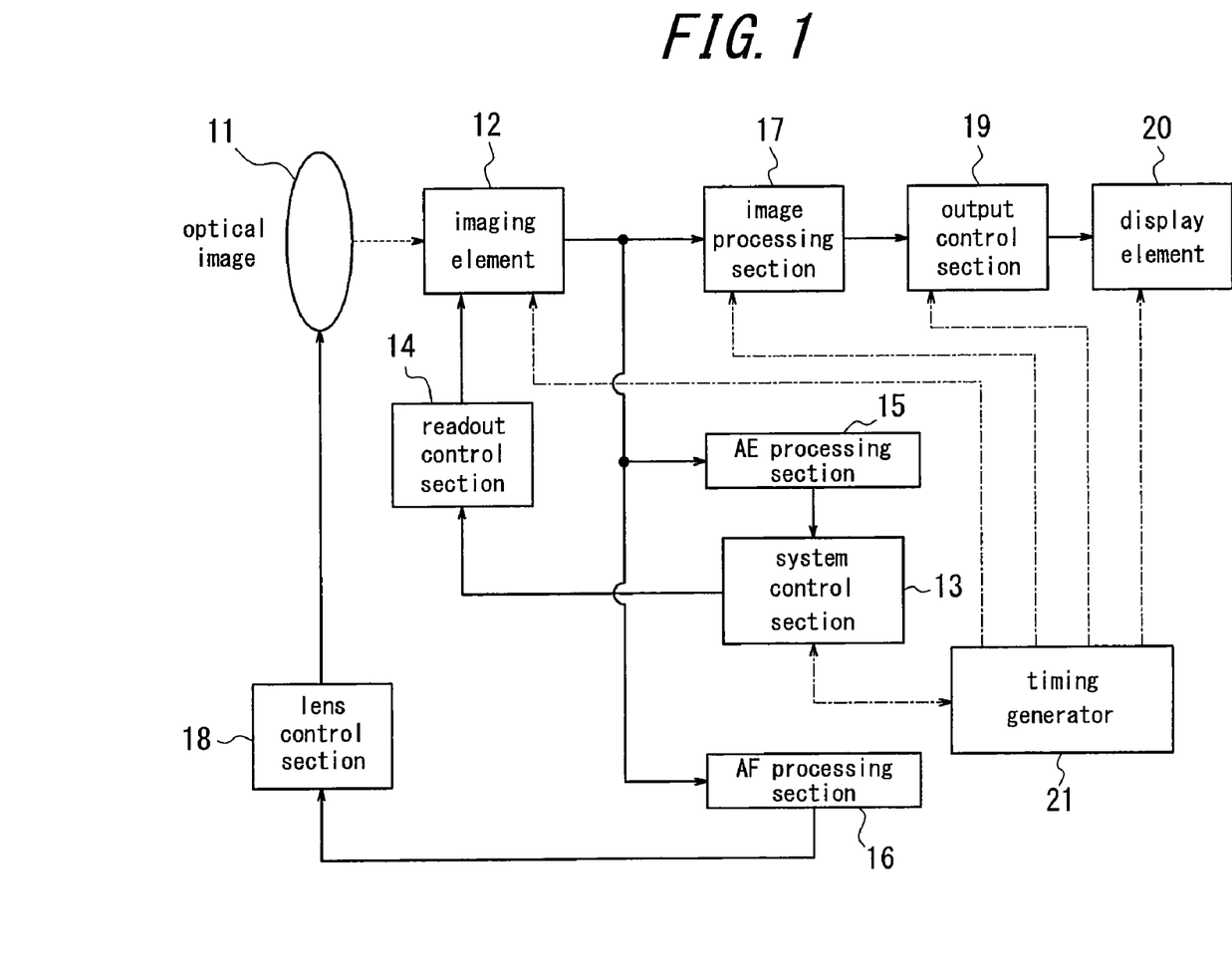
FIG. 1 is a functional block diagram illustrating a schematic configuration of an imaging and display apparatus in the first embodiment of the present invention.

FIG. 1 is a functional block diagram illustrating the schematic configuration of an imaging and display apparatus in the first embodiment of the present invention. The imaging and display apparatus comprises an imaging optical system 11, an imaging element 12, a system control section 13, a readout control section 14, an AE processing section 15, an AF processing section 16, an image processing section 17, a lens control section 18, an output control section 19, a display element 20 and a timing generator 21 controlling the operation of each section. Here, the image processing section 17 comprises the display image information generation section and the display element 20 comprises the display section.

In FIG. 1, an optical image of a subject (not shown) is formed on the imaging element 12 by the imaging optical system 11, and is subjected to photoelectric conversion. The imaging element 12 is constituted of an image sensor such as a CCD sensor or a CMOS sensor. In the present embodiment, the imaging element 12 is constituted of a single-plate COMS sensor (for example having pixels of 4096*2400) having a color filter in the form of Bayer array.

The imaging element 12, based on a timing signal generated by the timing generator 21, controls the imaging frame rate by controlling exposure time and/or output time of image information (image signal), while reading out image information in a desired readout mode by controlling the readout position of the pixel by the readout control section 14 via the system control section 13. The image information read out of the imaging element 12 is performed desired processing such as Correlated Double Sampling (CDS), Auto Gain Control (AGC) or A/D conversion by a built-in processing section (not shown), and fed to the AE processing section 15, the AF processing section 16 and the system control section 17 as digital image information.

The AE processing section 15 detects a brightness component of the input image information, and, based on the detected result, controls the exposure time of the imaging element 12 by the timing generator 21 via the system control section 13 so that the image has an appropriate brightness.

On the other hand, the AF processing section 16 calculates the contrast of the image based on the input image information, and, based on the calculated result, forms a focused image of the subject on the imaging element 12 by driving the imaging optical system 11 via the lens control section 18 so that high contrast image can be obtained. Therefore, in the present embodiment, the focus control section for performing the focus control of the imaging optical system 11 is constituted including the AF processing section 16 and the lens control section 18.

The image processing section 17 constitutes an image selection section for selecting the image information which is displayed on the display element 20 from the image information read out of the imaging element 12. Based on the timing signal generated by the timing generator 21, the image processing section 17 performs various image processing such as demosaicing, edge reinforcement, resizing, distortion correction, tonal and gradation correction on the selected image, and passes the processed image information to the output control section 19. Though not shown in Figure, the image processing section 17 also comprises a JPEG compression section. Based on the operation of the release button or the like, the image processing section 17 controls the JPEG compression section so that it can process the exposed still images or moving images to be stored in a storage medium.

The output control section 19 converts the image information passed from the image processing section 17 into the appropriate size and frame rate for the number of pixels of the display element 20 as needed, and based on the timing signal generated by the timing generator 21, displays the converted image information on the display element 20.

A transmissive LCD which needs back light, reflection LCOS or a light-emitting EL element may be used in the display element 20, however a transmissive LCD (for example pixels of 1024*600) is used in the present embodiment. The image displayed on the display element 20 can be observed by an observer via, for example, a finder type ocular optical system (not shown) which can adjust diopter scale.

In FIG. 1, the system control section 13, the AE processing section 15, the AF processing section 16, the image processing section 17, the output control section 19 and the timing generator 21 can be configured using a CPU.

Figure 2:
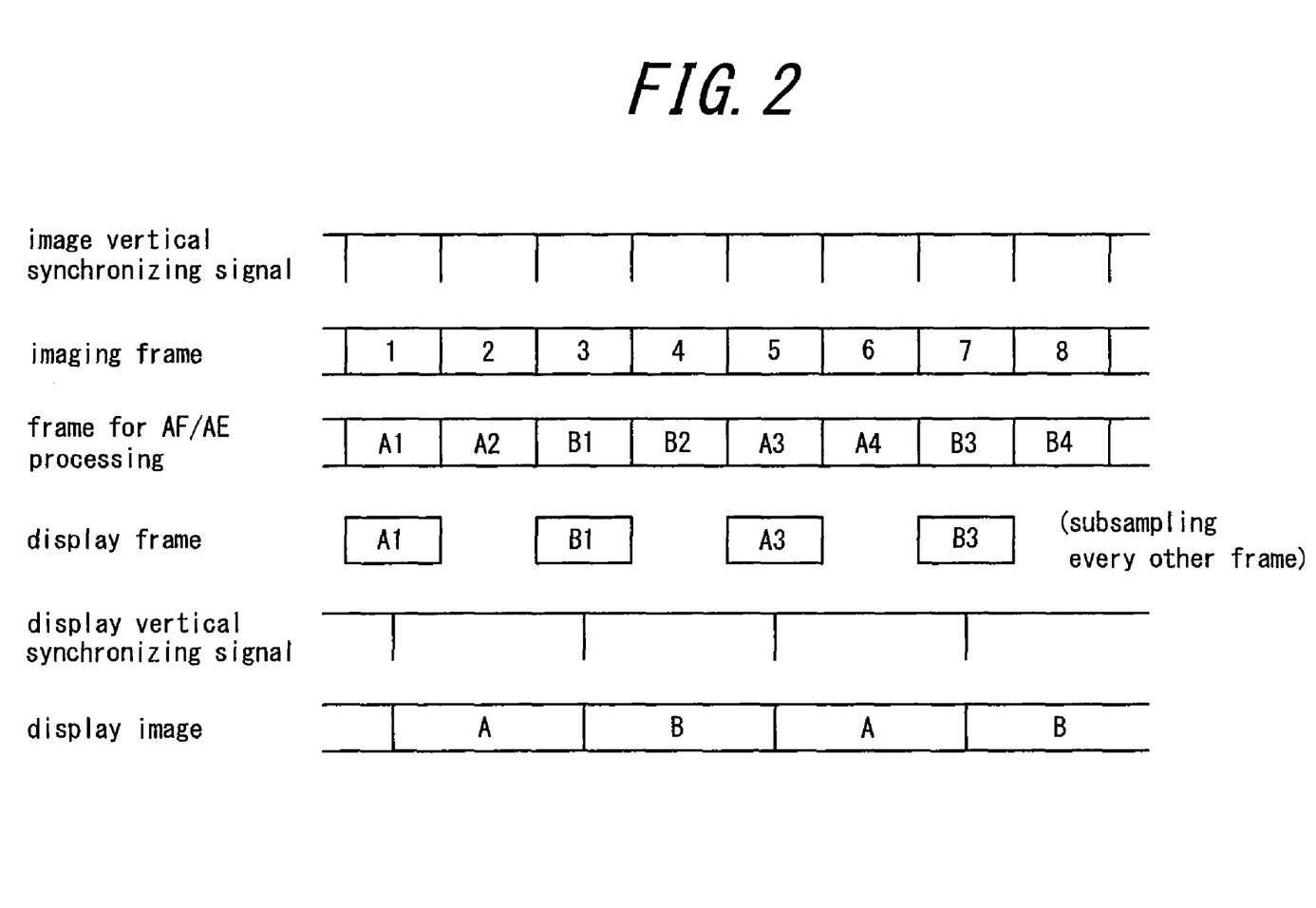
FIG. 2 is a timing chart showing the operation of the main part of the imaging and display apparatus shown in FIG. 1.

In the present embodiment, as shown in the timing chart in the main part of FIG. 2, an example case in which the imaging frame rate of the imaging element 12 is twice as high as the displaying frame rate of the display element 20 is considered. In order to display through images, two sequential image frames are subsampled by pixel subsampling and image information A1 and A2 are read out from the imaging element 12 by the readout control section 14. After that, another two sequential image frames are subsampled, and image information B1 and B2, which is spatially different in the vertical direction, are read out. Herein, the image information A1 and A2 may be either spatially different or same in the horizontal direction. Similarly, the image information B1 and B2 may also be either spatially different or same in the horizontal direction. Subsequently, these sequential four image frames form one cycle, and are repeatedly read out in the same way.

Therefore, in the present embodiment, the image information is read out so that it includes spatially different image information in the vertical direction in each 20 sequential readout period of the imaging element 12 corresponding to each sequential display frame of the display element 20. That is, for example, in the period comprising the imaging frame 1, 2 corresponding to the display frame A1 and the period comprising the image frame 3, 4 corresponding to the display frame B1 of FIG. 2.

The readout image information from the imaging element 12 is fed to the AE processing section 15 and the AF processing section 16 for performing AE processing and AF processing, while is fed to the image processing section 17. The image processing section 17 skips every other frame of image information from the imaging element 12 and alternately selects the image information A1 and the image information B1. Then, the image processing section 17 processes the selected image information A1 and B1, and provides them to the display element 20 via the output control section 19.

Consequently, the image information A and B each corresponding to the image information A1 and B1 in the every other imaging frames of the imaging element 12 are alternately displayed on the display element 20 in an interlaced manner synchronized with the display frame. In this example, the image information A3 and B3 are read out so that the spatial relation of the image information A3 and B3 is same as that of the image information A1 and B1. In addition, the image information A1 and A3 as well as the image information B1 and B3 are different data respectively.

Figure 3:
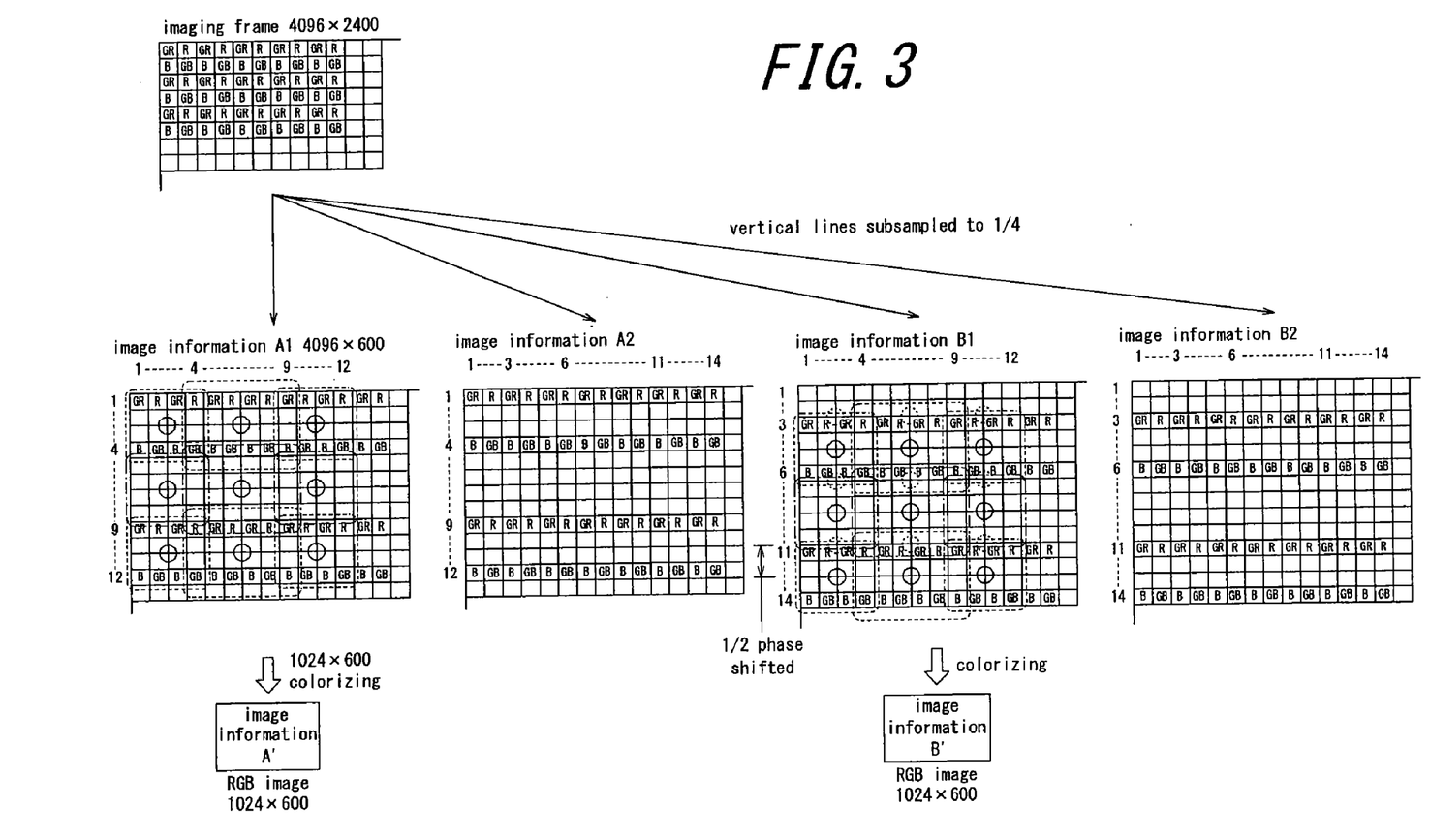
FIG. 3 is a diagram explaining an example of the readout of the image information and the image processing in the first embodiment.

FIG. 3 is a diagram for explaining an example of the readout of the image information from the imaging element 12 and the image processing in the image processing section 17 in this case. Herein, CMOS sensor of 4096*2400 pixels having color filter in the form of Bayer array is used as the imaging element 12, and the transmissive LCD of 1024*600 pixels for each R, G, B is used as the display element 20.

In FIG. 3, when reading out the image information A1, A2, B1, B2 from the imaging element 12, 4096*600 pixels are read out by subsampling the vertical lines of the imaging element 12 into ¼. For example, for the image information A1 and A2, (1+8n)th horizontal lines and (4+8n)th horizontal lines are read out respectively, and for the image information B1 and B2, (3+8n)th horizontal lines and (6+8n)th horizontal lines are read out respectively (n is a positive integer or 0).

On the other hand, in the image processing section 17, for the selected image information A1, (1+8n)th vertical lines and (4+8n)th vertical lines are extracted, and 2*2 synchronized image data comprising R, G, B color information are generated by combining the adjacent 2*2 pixels (8*8 pixels or the like is also possible) which constitute the Bayer array. In this case, image information A' of 1024*600 pixels is generated by adding or skipping the proximal same color pixel data in the horizontal direction. In other words, as schematically shown in FIG. 3, 2*2 synchronized image data comprising R, G, B color information is generated by combining 2*2 pixels (GR, B, R, GB) in the four corners of the block comprised of 4*4 pixels, 2*2 pixels (R, GB, GR, B) in the four corners of the block comprised of 6*4 pixels, 2*2 pixels (B, GR, GB, R) in the four corners of the block comprised of 6*4 pixels and 2*2 pixels (GB, R, B, GR) in the four corners of the block comprised of 6*6 pixels. These blocks are indicated by the dashed lines respectively. Meanwhile, the pixels of each block overlap with the pixels of neighboring block. In addition, in case of low sensitivity, synchronized image data is generated by combining R, GB, GR, B as one block by adding the neighboring same color pixels.

Similarly, for the selected image information B1, (3+8n)th vertical lines and (6+8n)th vertical lines are extracted, and 2*2 synchronized image data (image information B') of 1024*600 pixels comprising R, G, B color information is generated by combining the adjacent 2*2 pixels constituting the Bayer array, as is done in the case of the image information A1.

Therefore, in the selected image information A1 and B1, the pixels are read out with varying the readout position of the imaging element 12 so that the barycenter of each synchronized pixel spatially shift ½ in phase (½ pixel pitch) in the vertical direction in the display element 20. Meanwhile, in FIG. 3, the barycenter of each synchronized pixels are indicated by the solid circle in the image information A1 and B1, and the barycenter of each synchronized pixels in the image information A1 are indicated by the dashed circle in the image information B1 in order to show the spatial phase shift between them clearly. In addition, though pixels are read out so that their phases mutually shift ½ in the above example, even in the case that the phases are mutually shifted by ⅖ or ⅓, the resolution may be higher than that of the case that phases are not shifted.

The image information A' and B' generated as stated in the above are output to the display element 20 with their vertical line adjusted to be half (1024*300) by performing pixel-skipping or adding/averaging operation in the output control section 19 so that their size would be appropriate for displaying on the display element 20 in an interlaced manner, and then they are displayed in the display element 20 in the interlaced manner.

According to the present embodiment, with a compact and low cost configuration using one imaging element 12, AF processing can be performed in high imaging frame rate, and the resolution and dynamic resolution of the displayed image in the vertical direction can be improved, because the image information, which are taken from the different imaging frames by the imaging element 12 and which are spatially different in the vertical direction, are displayed in the interlaced manner in the sequential display frame of the display element 20 by controlling the readout position of the imaging element 12.

Figure 4:
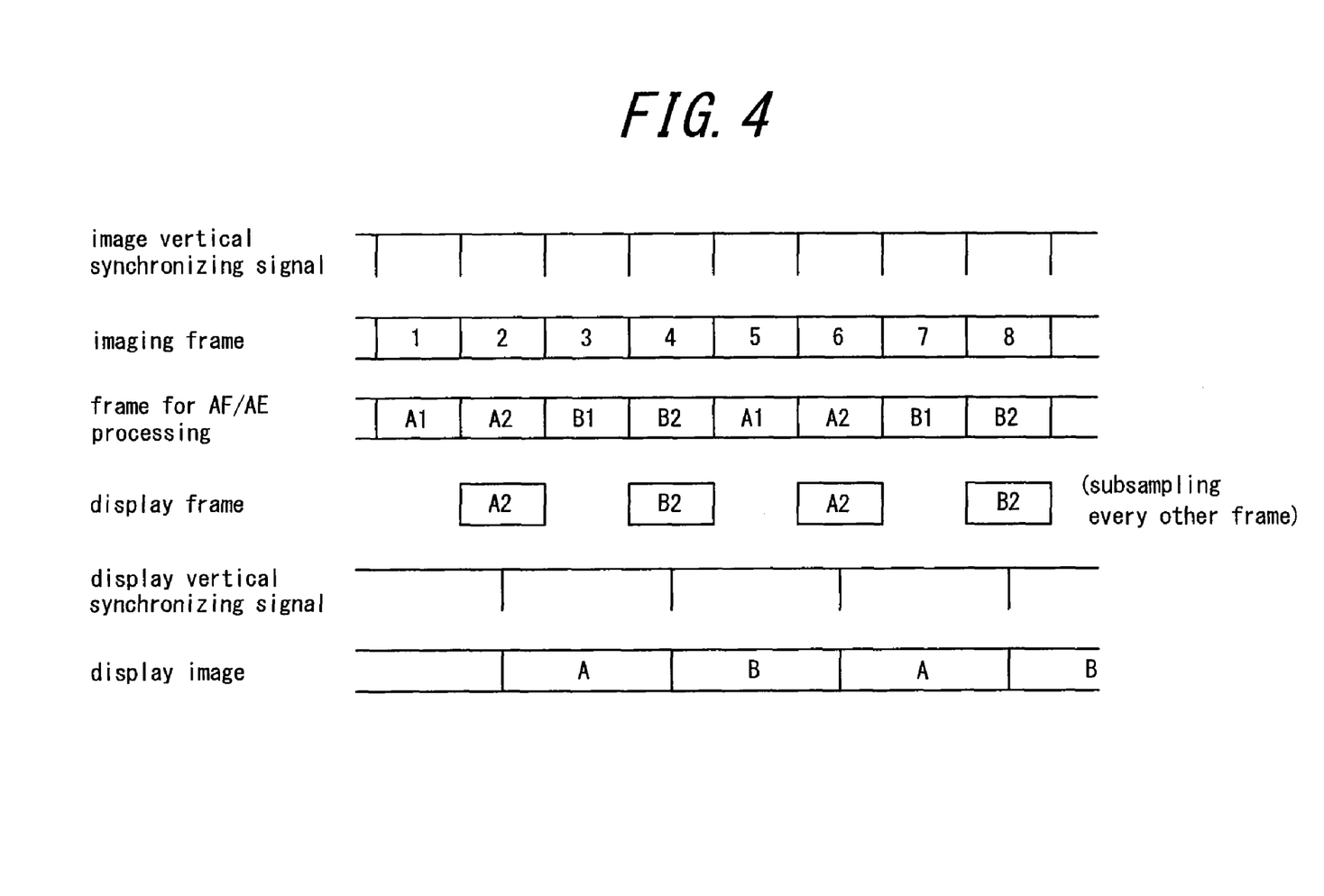
FIG. 4 is a timing chart showing the first variation of the first embodiment.

In the above explanation, though the image information A1 and B1 are alternately selected to be displayed in the image processing section 17, the image information A2 and B2 may be alternately selected to be displayed instead as shown in FIG. 4. In this case, for the respective selected image information A2 and B2 indicated in FIG. 3, (3+8n)th vertical lines and (6+8n)th vertical lines are extracted, and 2*2 synchronized image data of 1024*600 pixels including R, G, B color information is generated as is done in the above, where each data includes a set of the adjacent 2*2 pixels constituting the Bayer array.

Figure 5:
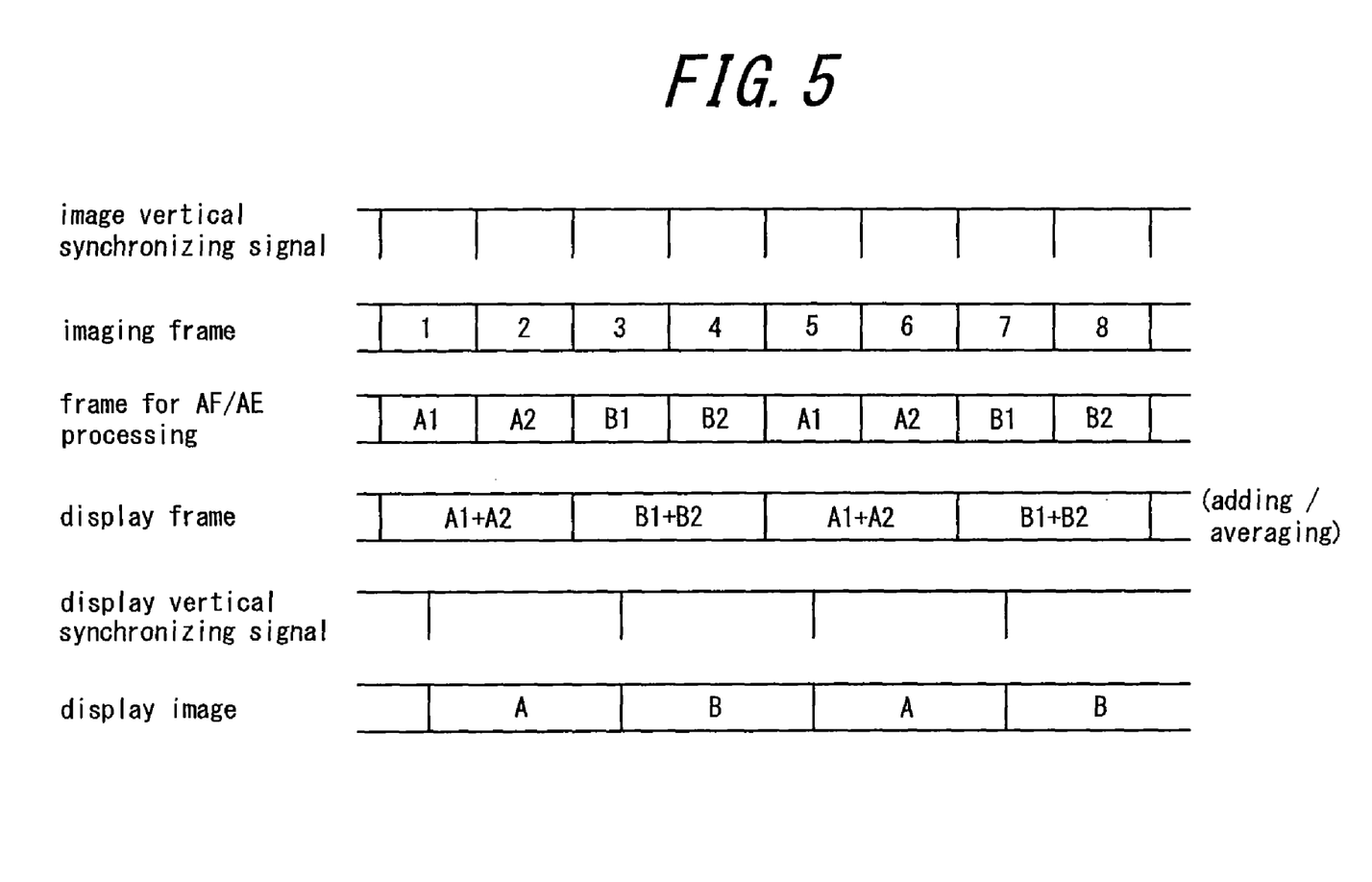
FIG. 5 is a timing chart showing the second variation of the first embodiment.

In addition, in the image processing section 17, as shown in FIG. 5, it is also possible to select all the image information from the imaging element 12 synchronizing with the display frame, and to display said selected image information in the display element 20 by performing the adding or averaging operation on the selected image information.

Furthermore, the image information read out of the imaging element 12 by the readout control section 14 has only to comprise spatially different image information in the sequential readout period of the imaging element 12 corresponding to the sequential display frame of the display element 20. Therefore, for example in FIG. 2, image information A1 and B1 may be sequentially read out by performing subsampling in the period including image frames 1 and 2 corresponding to the display frame A1, and image information B1 and A1 may be sequentially read out by performing subsampling in the period including image frames 3 and 4 corresponding to the display frame B1, and thereby the image information A1 and B1 may be alternately selected and displayed in the display element 20 by skipping every other frame.

Figure 6:
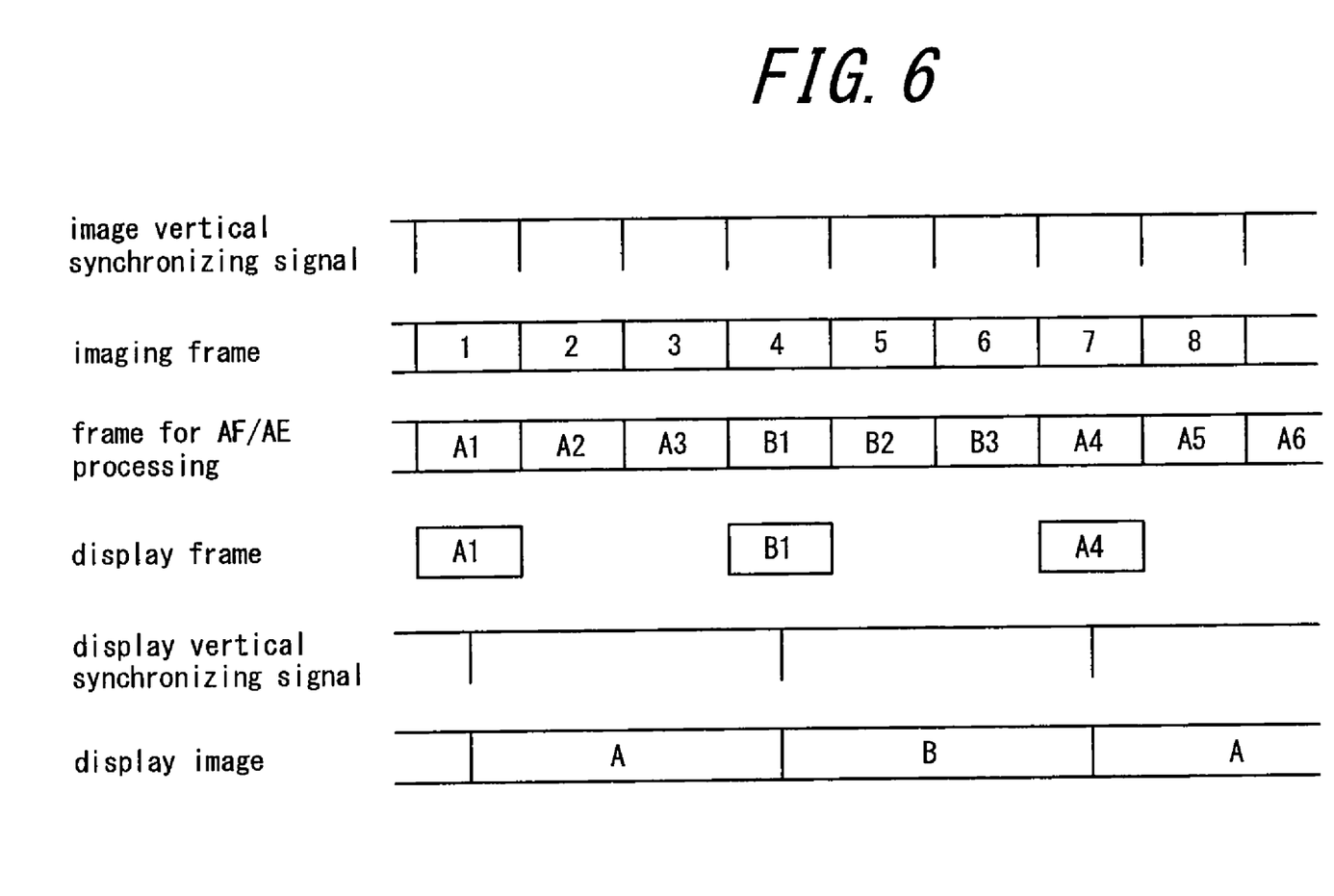
FIG. 6 is a timing chart showing the third variation of the first embodiment.

In the above, though it is explained on the case that the imaging frame rate of the imaging element 12 is twice as high as the displaying frame rate of the display element 20, the control may be done in the same way in the case that the imaging frame rate of the imaging element 12 is more than tripled as the displaying frame rate of the display element 20. For example, in the case that the imaging frame rate of the imaging element 12 is tripled as the displaying frame rate of the display element 20, with considering 6 image frames constitute one cycle, for example the image information A1, A2 and A3 are read out from the imaging element 12 by performing subsampling by the readout control section 14 in the first sequential three image frames, and the image information B1, B2 and B3 which are spatially different from the image information A1, A2 and A3 in the vertical direction are read out by performing subsampling in the next sequential three image frames as shown in FIG. 6, and image information is displayed on the display element 20 by alternately selecting the subsampled image information A1 and B1 in every two frames, or by selecting image information of three image frames corresponding to the display frame and performing adding or averaging operation to them.

Obviously, even in this case, the spatially different image information in the different imaging frames of the imaging element 12 has only to be displayed on the sequential display frame of the display element 20. For example in FIG. 6, it is possible to perform various kinds of readout control. One example is, in the period comprising the image frame 1, 2, 3 corresponding to the display frame A1, reading out the image information A1, A1, A1 in the same readout position by sequentially performing pixel subsampling, while in the period comprising image frame 4, 5, 6 corresponding to the display frame B1, reading out the image information B1, B1, B1 in the same readout position which spatially differs from that of the image information A1 by sequentially performing pixel subsampling. Another example is, in the period corresponding to the display frame A1, reading out the image information A1, B1, B1 with sequentially performing the pixel subsampling while in the period corresponding to the display frame B1, reading out the image information B1, A1, A1 with sequentially performing the pixel subsampling.

Embodiment 2

Figure 7:
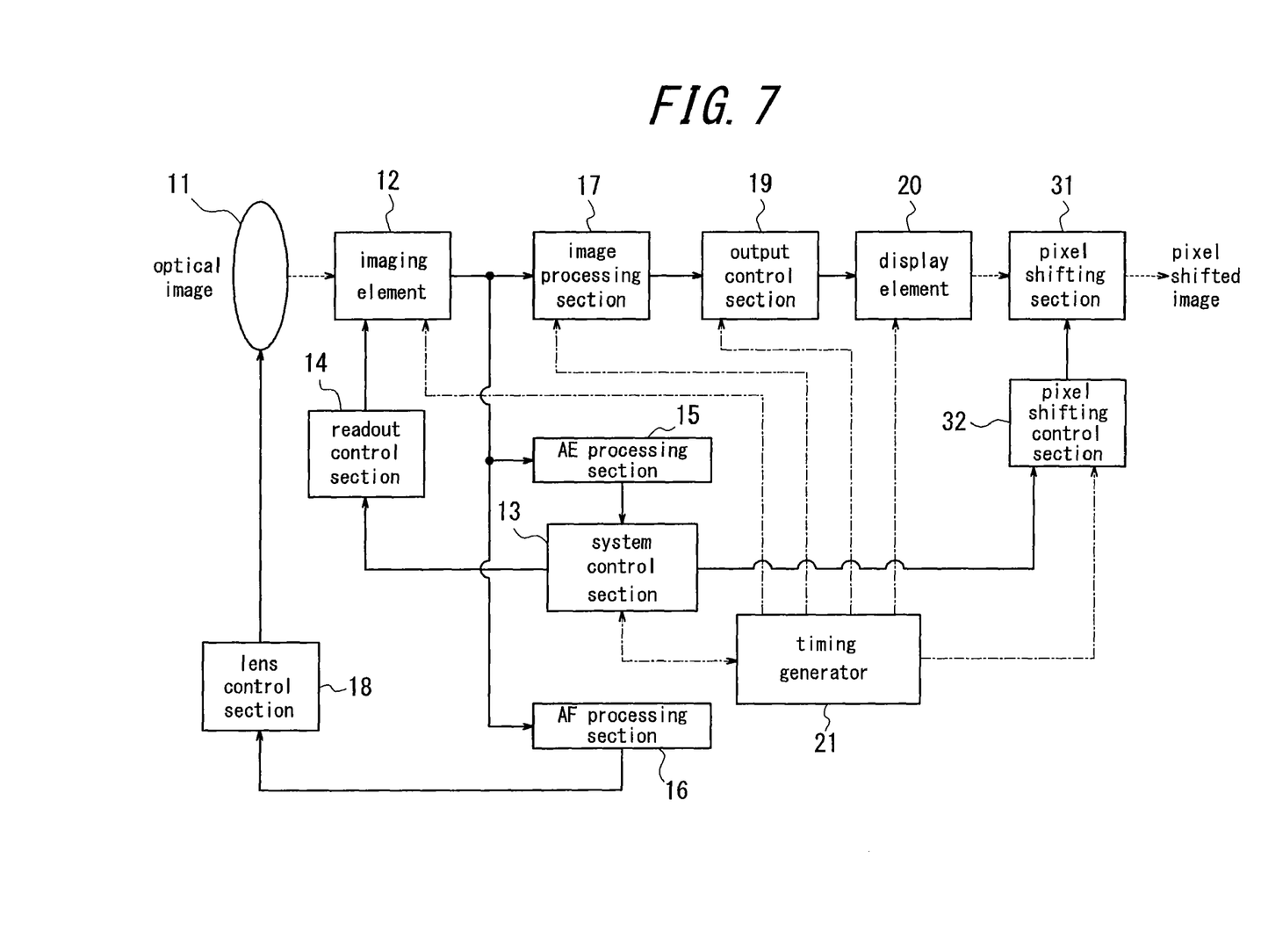
FIG. 7 is a functional block diagram illustrating the schematic configuration of an imaging and display apparatus in the second embodiment of the present invention.

FIG. 7 is a functional block diagram illustrating the schematic configuration of the imaging and display apparatus according to the second embodiment of the present invention. The imaging and display apparatus is intended to virtually improve the resolution by shifting the pixels of the image displayed on the display element 20 by providing pixel shifting section 31 and pixel shifting control section 32, while displaying the image information on the display element 20 in a progressive manner with the configuration shown in FIG. 1. The display element 20 and the pixel shifting section 31 comprise the display section in this embodiment.

The pixel shifting section 31 is configured to optically shift the display position of the display element 20 synchronized with the display frame based on the control of the pixel shifting control section 32. Meanwhile, the pixel shifting control section 32 is controlled by the system control section 13 based on the timing signal generated by the timing generator 21.

In the present embodiment, by controlling the pixel shifting section 31 with the pixel shifting control section 32, the display pixel position of the display element 20 is subjected to two points pixel shifting synchronized with the display frame that employs the original pixel position which is not shifted and the diagonal pixel position that pixels are spatially shifted half pixel pitch in the horizontal and vertical direction.

Figure 8:
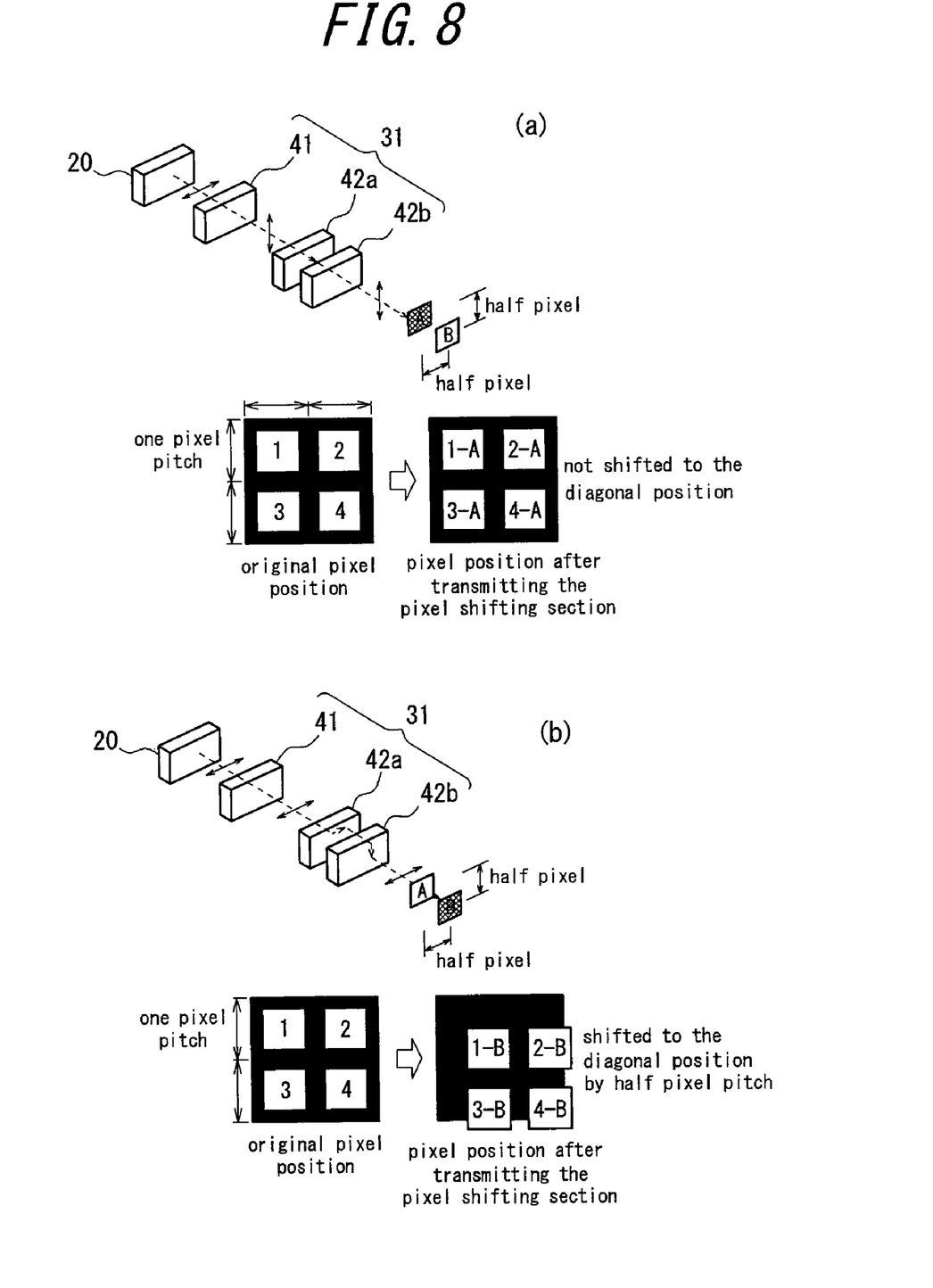
FIG. 8 is a diagram showing a constitution and the operation of an example of pixel shifting section shown in FIG. 7.

Therefore, the pixel shifting section 31 is configured by a liquid crystal cell 41 and two birefringent plates 42a and 42b as shown in FIG. 8. The liquid crystal cell 41 is configured for example by the TN liquid crystal or ferroelectric liquid crystal. The liquid crystal cell 41 transmits the incident light with maintaining its polarization direction in the ON state in which voltage is applied, and transmits the incident light with rotating its polarization direction 90 degrees in the OFF state in which voltage is not applied.

On the other hand, the two birefringent plates 42a and 42b are configured for example by the anisotropic crystal such as crystal, lithium niobate, rutile, calcite or Chile saltpeter. With these birefringent plates 42a and 42b, for P polarized incident light is shifted its pixel position by half pixel pitch in the horizontal direction by the birefringent plate 41a and by half pixel pitch in the vertical direction by the birefringent plate 41b, while S polarized incident light is transmitted without shifting the pixel position.

Thus, for example in the case that the polarization plane of the image light incident on the liquid crystal cell 41 from the display element 20 is in the horizontal direction (P polarized light), and the liquid crystal cell 41 is controlled to be in the OFF state by the pixel shifting control section 32 as shown in FIG. 8(a), the polarization plane of the image light incident from the display element 20 is rotated 90 degrees by the liquid crystal cell 41 to be in the vertical direction (S polarized light). Subsequently the observation pixel position of each pixels 1 to 4 of the image light incident on the liquid crystal cell 41 is determined as the pixel position 1-A to 4-A respectively after transmitting the birefringent plate 42a and 42b without shifting the pixels.

On the other hand, in the case that the liquid crystal cell 41 is controlled to be in the ON state by the pixel shifting control section 32 as shown in FIG. 8(b), the polarization plane of the image light incident from the display element 20 remains to be P polarized without being rotated while transmitting the liquid crystal cell 41. Subsequently the observation pixel position of each pixels 1 to 4 of the image light incident on the liquid crystal cell 41 is shifted to the diagonal pixel position 1-B to 4-B respectively by shifting the pixel position by half pixel pitch in the horizontal direction by the birefringent plate 42a, and then by shifting the pixel position by half pixel pitch in the vertical direction by the birefringent plate 42b in the pixel shifting section 31. Herein, the four pixels of the display element 20 is shown for clarifying the drawings in FIGS. 8(a) and (b).

Figure 9:
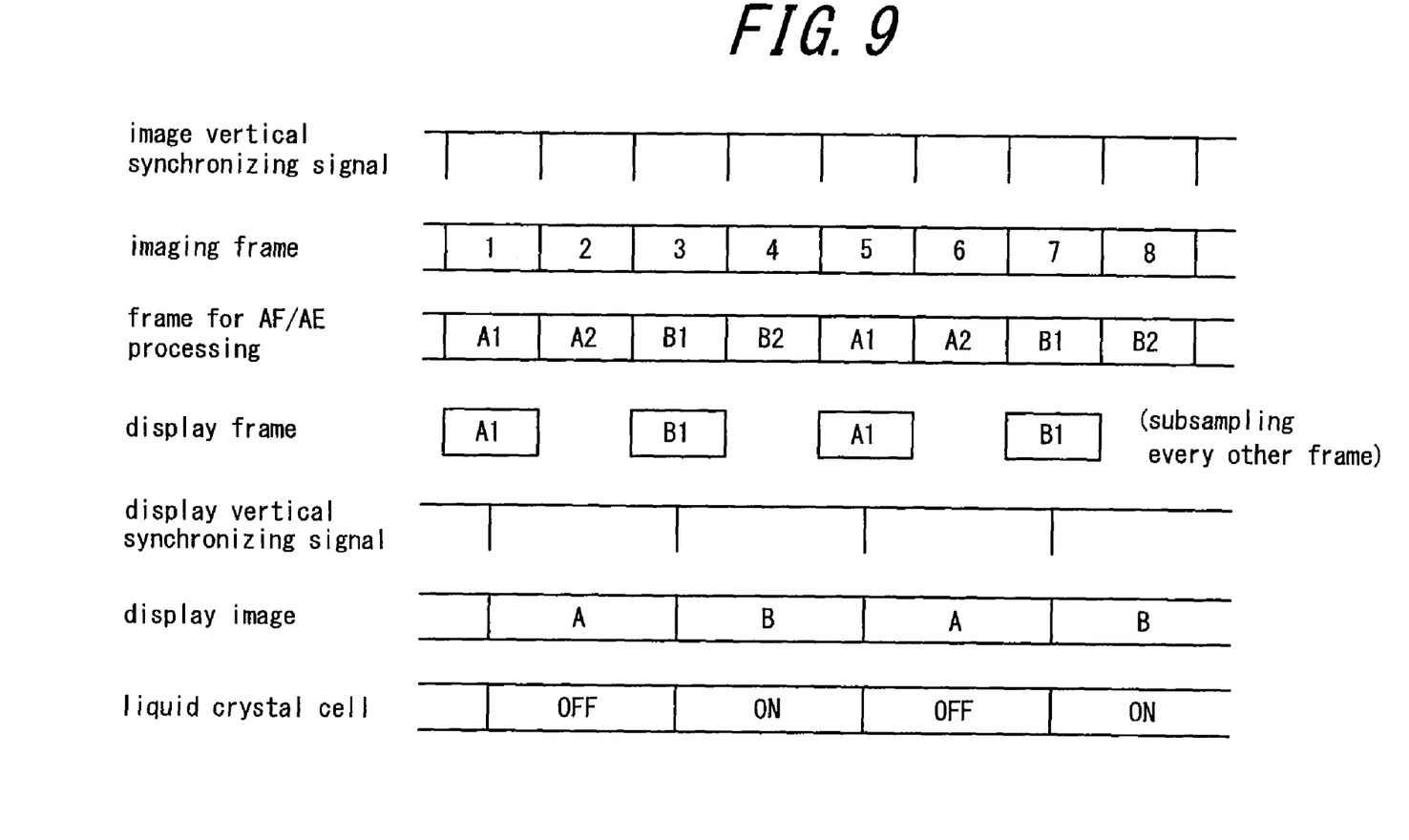
FIG. 9 is a timing chart showing the operation of the main part of the imaging and display apparatus shown in FIG. 7.

FIG. 9 is the timing chart showing the operation of the main part of the imaging and display apparatus according to the present embodiment. It shows the case that the imaging frame rate of the imaging element 12 is twice as high as the displaying frame rate of the display element 20 as shown in FIG. 2. In this case, the image information A1 and A2 are read out from the imaging element 12 by performing pixel subsampling to the sequential two imaging frames, the image information B1 and B2 which are spatially different from the image information A1 and A2 in the vertical direction, are read out by performing pixel subsampling to the next sequential two imaging frames, as is done in the case of FIG. 2.

The image information read out of the imaging element 12 is fed to the AE processing section 15 and AF processing section 16 to perform AE processing and AF processing, and is fed to the image processing section 17 to alternately select the image information A1 and the image information B1 by skipping every other frame. After performing the image processing on the selected image information A1 and B1, the selected image information A1 and B1 is sent to the display element 20 via the output control section 19 for displaying in the progressive manner.

Meanwhile, the liquid crystal cell 41 of the pixel shifting section 31 is controlled by the pixel shifting control section 32. It is controlled to be in the OFF state in case of displaying the image information A based on the image information A1, so as to display the pixel position of the display element at the original pixel position A which is not shifted. On the other hand, it is controlled to be in the ON state in the case of displaying the image information B based on the image information B1, so as to display the pixel position of the display element 20 at the pixel position B which is shifted diagonally.

Figure 10:
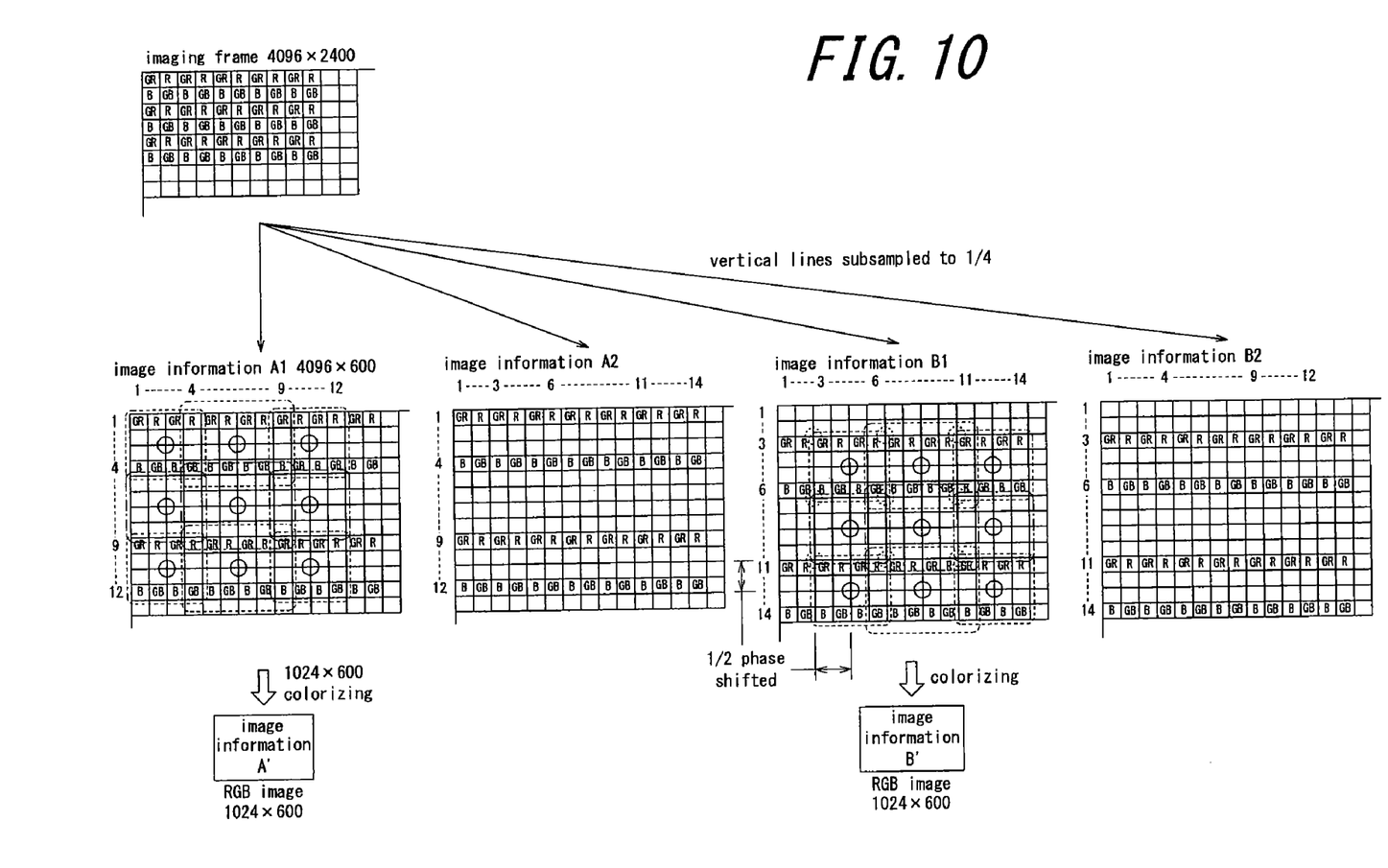
FIG. 10 is a diagram explaining an example of the readout of the image information and the image processing in the second embodiment.
Figure 11:
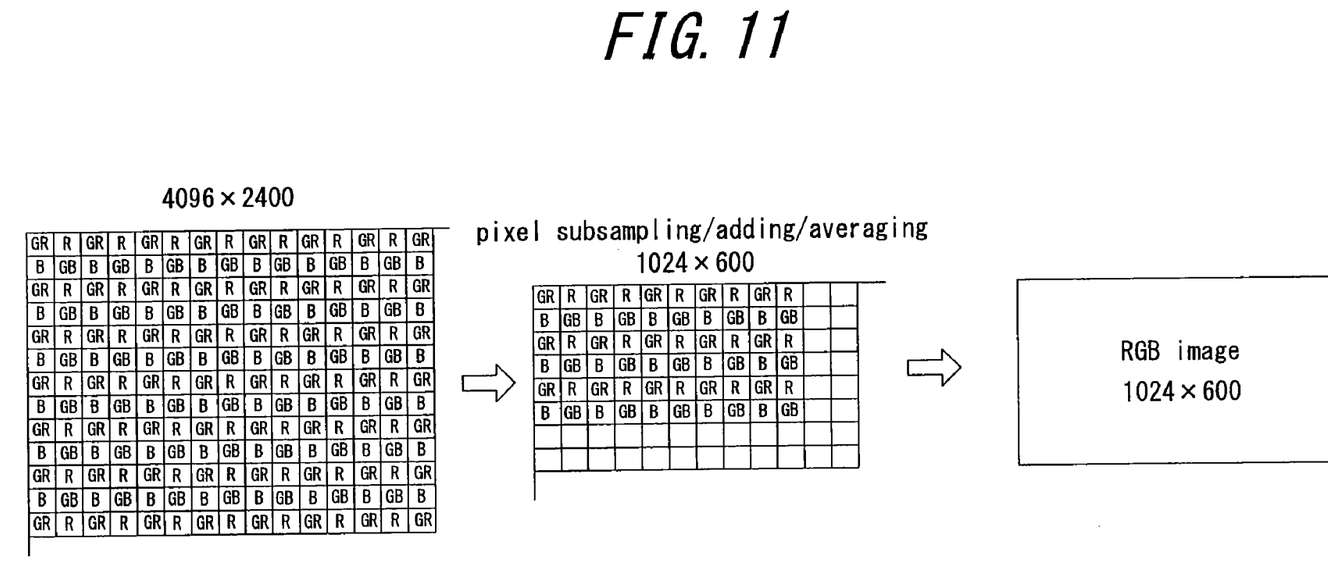
FIG. 11 is a diagram explaining a variation of the readout of the image information by the imaging and display apparatus according to the present invention.

FIG. 10 is a diagram explaining an example of the readout of the image information from the imaging element 12 and the image processing in the image processing section 17 of the present embodiment. Similar to the case shown in FIG. 3, the readout control section 14 sequentially read out the image information A1, A2, B1 and B2 from the imaging element 12. The image processing section 17 also selects the image information A1 and B1. For the image information A1, it performs the image processing similar to the case of FIG. 3 to generate the image information A'. For the image information B1, it performs the image processing to generate the diagonally shifted image information B' which is spatially shifted by the half pixel pitch of the display element 20 in the horizontal and vertical direction compared to the image information A'.

Therefore, for the image information B1, (3+8n)th vertical lines and (6+8n)th vertical lines are extracted, and 2*2 synchronized image data of 1024*600 pixels comprising R, G, B color information is generated by combining the adjacent 2*2 pixels constituting the Bayer array. Meanwhile, in FIG. 10, the barycenter of each synchronized pixels are indicated by the solid circles in the image information A1 and B1, and the barycenter of each synchronized pixels in the image information A1 are indicated by the dashed circles in the image information B1 in order to show the spatial phase shift between them clearly.

The image information A' and B' generated as described above are output to the display element 20 without changing the size in the output control section 19 and displayed in the progressive manner with performing the pixel shifting in the diagonal direction.

Therefore, according to the present embodiment, the resolution in the horizontal and vertical direction can be improved compared to that of the first embodiment.

In addition, the present invention is not restricted only to the above embodiments, and various changes and modifications can be made. For example, though all the 4096 pixels are read out from the imaging element 12 in the horizontal direction in FIGS. 3 and 10, the image information may be read out as a Bayer array of 1024*600 pixels by performing pixel subsampling, adding or averaging in the horizontal direction as well, and the selected image information in the image processing section 17 can be processed into the R, G, B image of 1024*600 pixels, for example, as shown in FIG. 17.

In addition, though two points pixel shifting in the diagonal direction is performed in the second embodiment, two points pixel shifting in the horizontal direction, two point pixel shifting in the vertical direction or a total of four points pixel shifting in the horizontal and vertical direction may be performed. As an example of performing four points pixel shifting, in case that the imaging frame rate is twice as high as the display frame rate, readout cycle of the image information from the imaging element 12 may be, for example, sequential eight frames consisted by reading out two successive frames for each of the image information A1, A2, B1 and B2 respectively in FIG. 3. In the above example, two successive frames for each of the image information A1, A2, B1 and B2 are read out, however, it is only required that the image information used for displaying information are spatially different A1, A2, B1 and B2, and the frames to be skipped need not be image information A1, A2, B1 and B2. In addition, in the image processing section 17, four spatially different image information in the horizontal and vertical direction are sequentially generated by sequentially selecting image information A1, A2, B1 and B2 by skipping every other frame in the input image information, and image processing on the selected image information is performed. Then, the generated image information are displayed on the display element 20 in the progressive manner, and the pixel position of the display element 20 is shifted by performing four points pixel shifting in the horizontal and vertical direction synchronized with the display frame by the pixel shifting section for the four points pixel shifting.

In addition, the spatially different image information read out of the imaging element 12 is not limited on the above embodiment. For example, it may be the image information from the odd lines of the imaging element 12 or the image information from the even lines of the imaging element 12.

What is claimed is:

1. An imaging and display apparatus comprising;
   an imaging element for performing photoelectric conversion on an optical image formed by an optical system;
   a readout control section for controlling said imaging element for sequentially reading out a first image information in which plural kinds of frames including frames corresponding to pixel arrays spatially shifted half pixel pitch in the horizontal and/or vertical direction included in the imaging element form one cycle;
   a display image information generating section for generating a second image information to be displayed based on said first image information, the second image information comprising plural kinds of frames including frames corresponding to spatially different pixel arrays included in the imaging element which form one cycle, and frame rate of which being lower than that of said first image information;
   a display element for displaying the image represented by respective frames of said second image information including frames corresponding to pixel arrays spatially shifted half pixel in the horizontal and/or vertical direction included in said imaging element in a progressive manner; and
   an image shifting section for optically and mutually shifting the images of the plural kinds of frames displayed by said display element according to the mutual shift of barycentric positions of the images in the plural kinds of frames.

2. The imaging and display apparatus according to claim 1, wherein said readout control section controls the readout of said imaging element so that spatially different image information at least in the vertical direction is included.

3. The imaging and display apparatus according to claim 1, wherein said display image information generating section generates the second image information to be displayed based on the image information obtained by performing adding or averaging operation on the image information of sequential frames of said first image information corresponding to spatially identical pixel arrays included in the imaging element, wherein plural kinds of frames including frames corresponding to spatially different pixel arrays form one cycle in the second image information, and wherein frame rate of the second image information is lower than that of said first image information.

4. The imaging and display apparatus according to claim 1, wherein said imaging element comprises a color filter in the form of Bayer array, and said display image information generating section generates said second image information so that the image information of each frame constituting said second image information includes color information in the Bayer array.

5. The imaging and display apparatus according to claim 4, wherein said image information generating section generates said second image information based on the image information subsampled so as to include R, G, B image information constituting the Bayer array generated based on pixel signals of $(1+8n)$th vertical lines and $(4+8n)$th vertical lines and R, G, B image information constituting the Bayer array generated based on pixel signals of $(3+8n)$th vertical lines and $(6+8n)$th vertical lines, where n is a positive integer.

6. The imaging and display apparatus according to claim 1, wherein the apparatus further comprises a focus control section controlling said optical system to be focused by processing said first image information which is sequentially read out of said imaging element.

7. An imaging and display method comprising;
   a step for sequentially reading out a first image information from an imaging element, in which plural kinds of frames including frames corresponding to pixel arrays spatially shifted half pixel in the horizontal and/or vertical direction included in the imaging element form one cycle;
   a step for generating a second image information to be displayed in which plural kinds of frames including frames corresponding to spatially different pixel arrays form one cycle, and frame rate of which is lower than that of said first image information;
   a step for displaying the image represented by respective frames of said second image information including plural kinds of frames corresponding to pixel arrays spatially shifted half pixel in the horizontal and/or vertical direction included in the imaging element in a progressive manner, the image represented by the respective frames being optically and mutually shifted; and
   a step for optically and mutually shifting the displayed images of the plural kinds of frames according to the mutual shift of barycentric positions of the images in the plural kinds of the frames.

* * * * *